(12) United States Patent
Song et al.

(10) Patent No.: US 7,403,349 B2
(45) Date of Patent: Jul. 22, 2008

(54) OPTICAL PICKUP ACTUATOR, OPTICAL PICKUP, AND OPTICAL RECORDING AND/OR REPRODUCING APPARATUS

(75) Inventors: Byung-youn Song, Suwon-si (KR); Hyung-joo Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 625 days.

(21) Appl. No.: 10/900,426

(22) Filed: Jul. 28, 2004

(65) Prior Publication Data
US 2005/0025033 A1 Feb. 3, 2005

(30) Foreign Application Priority Data
Jul. 28, 2003 (KR) .................. 10-2003-0052133

(51) Int. Cl.
G02B 7/02 (2006.01)
(52) U.S. Cl. ...................... 359/824; 359/814
(58) Field of Classification Search .............. 359/824
See application file for complete search history.

(56) References Cited

U.S. PATENT DOCUMENTS

| | | |
|---|---|---|
| 5,684,645 A | 11/1997 | Tomiyama et al. |
| 6,795,258 B2 * | 9/2004 | Jang .................... 359/822 |
| 2002/0071358 A1 * | 6/2002 | Kim et al. ............ 369/44.16 |
| 2003/0021218 A1 * | 1/2003 | Song et al. ............ 369/244 |
| 2003/0128443 A1 * | 7/2003 | Jang et al. ............ 359/824 |

FOREIGN PATENT DOCUMENTS

| | | |
|---|---|---|
| CN | 1355918 | 6/2002 |
| CN | 1396587 | 2/2003 |
| KR | 10-2002-0079318 A | 10/2002 |
| WO | WO 98/54705 | 3/1998 |
| WO | WO 98/54705 | 12/1998 |

OTHER PUBLICATIONS

Korean Office Action for 10-2002-0070865.

* cited by examiner

Primary Examiner—Jordan Schwartz
Assistant Examiner—James C Jones
(74) Attorney, Agent, or Firm—Staas & Halsey LLP

(57) ABSTRACT

An optical pickup actuator having: a holder positioned at one side of a base; a lens holder on which an objective lens is mounted, a magnetic driving portion having focusing coils, tracking coils, and tilting coils, and a magnet used to drive the lens holder in focusing, tracking, and tilting directions; at least one support member supporting the lens holder, one end of the support member being combined with the holder, and an other end thereof being combined with the lens holder; and wires installed separate from the support member to apply a current to the focusing coil, the tracking coil, and the tilting coil.

38 Claims, 9 Drawing Sheets

OPTICAL PICKUP ACTUATOR, OPTICAL PICKUP, AND OPTICAL RECORDING AND/OR REPRODUCING APPARATUS

CROSS-REFERENCE TO RELATED APPLICATIONS

This application claims the priority of Korean Patent Application No. 2003-52133, filed on Jul. 28, 2003, in the Korean Intellectual Property Office, the disclosure of which is incorporated herein by reference.

BACKGROUND OF THE INVENTION

1. Field of the Invention

The present invention relates to an optical pickup actuator that can be driven centering on the same driving axis as an optical axis of an objective lens, and improves sensitivity by preventing subsidiary resonance caused by a leakage magnetic flux, and an optical pickup, and an optical recording and/or reproducing apparatus using the same.

2. Description of the Related Art

Typically, an optical pickup is a device that is used in an optical recording and/or reproducing apparatus, moves in a radial direction of an optical disc as an optical recording medium, and performs recording and/or reproducing of information on and/or from the optical disc in a noncontact manner.

The optical pickup requires an optical pickup actuator, which drives an objective lens in tracking and focusing directions of an optical disc, so that light emitted from a light source is formed as a light spot in an appropriate position on an optical disc. But the desire to make a portable personal computer (PC), such as a notebook, thin and light, causes limitations in available space in such a computer. Thus, an actuator used in the portable PC should be made slim.

A reflector is used in the optical pickup to direct light toward the objective lens. As the actuator should be made slim, an asymmetric actuator having a driving axis different from an optical axis of the objective lens has been proposed, to reduce a distance between the objective lens and the reflector of the optical pickup. An example thereof is disclosed in U.S. Pat. No. 5,684,645.

Referring to FIGS. 1 and 2, a holder 14 is positioned at one side of a conventional optical pickup actuator 10, a focusing coil 18 is wound along an outer circumference of a lens holder 12, a first accommodation groove 16a is positioned at a center of the lens holder 12, and a pair of tracking coils 15 are wound at one side of the lens holder 12. In addition, a second accommodation groove 16b is positioned in a moving portion 17, on which an objective lens 11 is mounted, and the lens holder 12 is accommodated in the second accommodation groove 16b. Here, a U-shaped yoke 31 is inserted into the first and second accommodation grooves 16a and 16b, and a magnet 32 is mounted at one side of the U-shaped yoke 31 to face the pair of tracking coils 15.

One end of each of a pair of suspensions 13a and 13b is fixed in the holder 14, and the respective other ends thereof are fixed at sides of the moving portion 17. The moving portion 17 is supported by the pair of suspensions 13a and 13b, and the moving portion 17 and the lens holder 12 are combined with each other to move together.

If a current is applied to the focusing coil 18 and the tracking coil 15, a force is applied to the coils 18 and 15 by an electromagnetic interaction between the magnet 32 and the focusing coil 18 or the tracking coil 15, such that the moving portion 17 moves. A direction in which the force is applied to the focusing coil 18 and the tracking coil 15 follows Flemings Left Hand Rule.

Thus, if an electromagnetic force acts on the coils 18 and 15 by the electromagnetic interaction between the magnet 32 and the focusing coil 18 or the tracking coil 15, the lens holder 12 moves in a focusing direction F or a tracking direction T. As such, the moving portion 17 combined with the lens holder 12 moves together, and simultaneously, the objective lens 11 moves, and a position in which a light spot is formed in a disc (not shown) is adjusted.

FIGS. 3A and 3B schematically show an electromagnetic interaction between the focusing coil 18 and the magnet 32. Here, the focusing coil 18 includes a portion 18a placed inside the U-shaped yoke 31 and a portion 18b placed outside the U-shaped yoke 31. However, an electromagnetic force is applied to the portion 18a of the focusing coil 18 placed inside the yoke 31 by an interaction between the portion 18a of the focusing coil 18 and the magnet 32. On the other hand, the portion 18b of the focusing coil 18 placed outside the yoke 31 is blocked by the yoke 31 and thus, is not affected by the magnet 32. But in actuality, as indicated by a dotted line of FIG. 3A, a magnetic flux generated in the magnet 32 is deviated from the center of the magnet 32 and is widely spread at an edge of the magnet 32. Then, the magnetic flux is deviated from the yoke 31 and is leaked to the outside.

The portion 18b of the focusing coil 18, placed outside the yoke 31, is affected by a leakage magnetic flux. Arrows from the focusing coil 18 of FIG. 3A represent the size and direction of a force applied to the focusing coil 18 by distribution of a magnetic flux in accordance with Flemings Left Hand Rule. In this way, a force is applied to the portion 18b of the focusing coil 18 placed outside the yoke 31 by a leakage magnetic flux, and this causes distribution of a nonuniform force applied to the focusing coil 18. In other words, as is shown in FIG. 3B, a force $F_u$ applied to the portion 18a of the focusing coil 18 placed inside the yoke 31 and a force $F_d$ applied to the portion 18b of the focusing coil 18 placed outside the yoke 31 are nonuniform such that a pitching mode, in which the lens holder 12 and the moving portion 17 are shaken back and forth, is formed. That is, the lens holder 12 and the moving portion 17 are shaken in a direction of arrow P of FIG. 3B.

In addition, the portion 18b of the focusing coil 18 placed outside the yoke 31 is a coil that is not used for a focusing operation, and due to an increase in mass and wound coil resistance, sensitivity of the actuator is lowered. Thus, a problem occurs in a high-speed follow capability caused by high-speed of a disc.

Since a motion centroid H of the tracking coils 15 is not identical with a mass centroid G of the tracking coils 15 during motion in the tracking direction T caused by the pair of tracking coils 15, a rolling mode is formed. As is shown in FIG. 4A, when the lens holder 12 stops, a mass centroid G of the actuator 10 is identical with a motion centroid H of the lens holder 12. Arrows of FIG. 4A represent the size and direction of a force applied to the tracking coils 15 by the magnet 32. The size of a force applied to the tracking coils 15 depends on the size of current and a magnetic flux flowing through the tracking coils 15. When a current is constant, the size of the force applied to the tracking coils 15 depends on only the size of a magnetic flux. The magnetic flux is the largest in the center of the magnet 32, and is gradually reduced closer to an edge of the magnet 32.

As is shown in FIG. 4A, when the tracking coils 15 are in a neutral position, a magnetic flux is distributed symmetrically with respect to the tracking coils 15. As such, the mass centroid G of the tracking coils 15 is identical with the motion centroid H of the tracking coils 15.

But as is shown in FIG. 4B, if the lens holder 12 is focused upward by the focusing coil 18, a force applied to the tracking coils 15 by the magnet 32 is deflected to a lower portion of the tracking coils 15. Thus, since a tracking force in a downward direction of the lens holder 12 is larger than a tracking force in an upward direction of the lens holder 12, a rotational moment occurs in a direction of arrow R1.

On the other hand, as is shown in FIG. 4C, if the lens holder 12 is focused downward by the focusing coil 18, a force applied to the tracking coils 15 by the magnet 32 is deflected to an upper portion of the tracking coils 15. Thus, since a tracking force in the upward direction of the lens holder 12 is larger than a tracking force in the downward direction of the lens holder 12, a rotational moment occurs in a direction of arrow R2.

Consequently, as is shown in FIG. 4D, since the motion centroid H and the mass centroid G of the tracking coils 15 are not identical with each other according to a focusing direction of the lens holder 12, a rolling mode that rolls in directions of arrows R1 and R2 is formed.

A rotational vibration mode, such as a pitching mode and a rolling mode, affects the phase and displacement of basic frequency characteristics during focusing and tracking operations, and thus, an optical signal is decreased. Thus, when the size of the magnet 32 is made large to increase magnetic flux density for improvement of AC sensitivity, a leakage magnetic flux is increased, subsidiary resonance occurs, and there is a limitation in an increase in magnetic flux density. Further, in a high-speed and high-density optical recording and/or reproducing apparatus, the pitching mode and the rolling mode are often generated. Thus, a high speed optical pickup actuator suitable for an optical recording and/or reproducing apparatus is needed.

In the case of tilting driving, in addition to focusing driving and tracking driving, the number of suspensions is at least six. It is very difficult to perform an operation of soldering such a suspension in a narrow space, and defective rates are high. Further, if a current is supplied to the suspension, heat is generated in a soldered portion, causing failure.

SUMMARY OF THE INVENTION

Embodiments of the present invention provide an optical pickup actuator in which an optical axis of an objective lens is the same as a driving axis of a magnetic driving portion, and a focusing coil, a tracking coil, and a tilting coil are arranged symmetrically, thereby reducing subsidiary resonance. Embodiments of the present invention also provide an optical pickup, and an optical recording and/or reproducing apparatus using the same.

Embodiments of the present invention also provide an optical pickup actuator having a small size to be combined without structural change of a peripheral system, and having high sensitivity. Embodiments of the present invention also provide and an optical pickup, and an optical recording and/or reproducing apparatus using the same.

According to an aspect of the present invention, there is provided an optical pickup actuator. The optical pickup actuator includes a holder positioned at one side of a base; a lens holder on which an objective lens is mounted; a magnetic driving portion having focusing coils, tracking coils, and tilting coils, and a magnet used to drive the lens holder in focusing, tracking, and tilting directions; at least one support member supporting the lens holder, one end of the support member being combined with the holder, and an other end thereof being combined with the lens holder; and wires installed separate from the support member to apply a current to the focusing coil, the tracking coil, and the tilting coil.

According to one aspect, the lens holder is approximately diamond shaped.

According to one aspect, the focusing coil is positioned around the lens holder, the tracking coil is positioned inclined to the magnet, and the tilting coil is symmetrically positioned at a first surface of the lens holder, with respect to a tracking direction.

According to one aspect, the wires are drawn out from the focusing coil, the tracking coil, and the tilting coil, and are combined with a drive IC.

According to one aspect, the magnet is installed in a base placed in a first direction of a path in which light emitted from an optical system transmitting light to the objective lens advances.

According to one aspect, an optical system transmitting light to the objective lens is positioned inclined with respect to the lens holder, and the lens holder has an inclined portion to prevent blockage of an optical path of light emitted from the optical system.

According to another aspect of the present invention, there is provided an optical pickup, which is installed to be movable in a radial direction of a disc and comprises an optical system having an objective lens to record and/or reproduce information on and/or from the disc and an optical pickup actuator which controls focusing, tracking, and tilting servos of the objective lens. The optical pickup actuator includes a holder positioned at one side of a base; a lens holder on which the objective lens is mounted; a magnetic driving portion having focusing coils, tracking coils, and tilting coils, and a magnet used to drive the lens holder in focusing, tracking, and tilting directions; at least one support member supporting the lens holder, one end of the support member being combined with the holder, and an other end thereof being combined with the lens holder; and wires installed separate from the support member to apply a current to the focusing coil, the tracking coil, and the tilting coil.

According to still another aspect of the present invention, there is provided an optical recording and/or reproducing apparatus to record and/or reproduce information on and/or from an optical disc, the optical recording and/or reproducing apparatus comprising: an objective lens; a lens holder on which the objective lens is mounted; and an optical pickup actuator to move the lens holder. The optical pickup actuator includes a holder positioned at one side of a base; a magnetic driving portion having focusing coils, tracking coils, and tilting coils, and a magnet used to drive the lens holder in focusing, tracking, and tilting directions; at least one support member supporting the lens holder, one end of the support member being combined with the holder, and an other end thereof being combined with the lens holder; and wires installed separate from the support member to apply a current to the focusing coil, the tracking coil, and the tilting coil.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
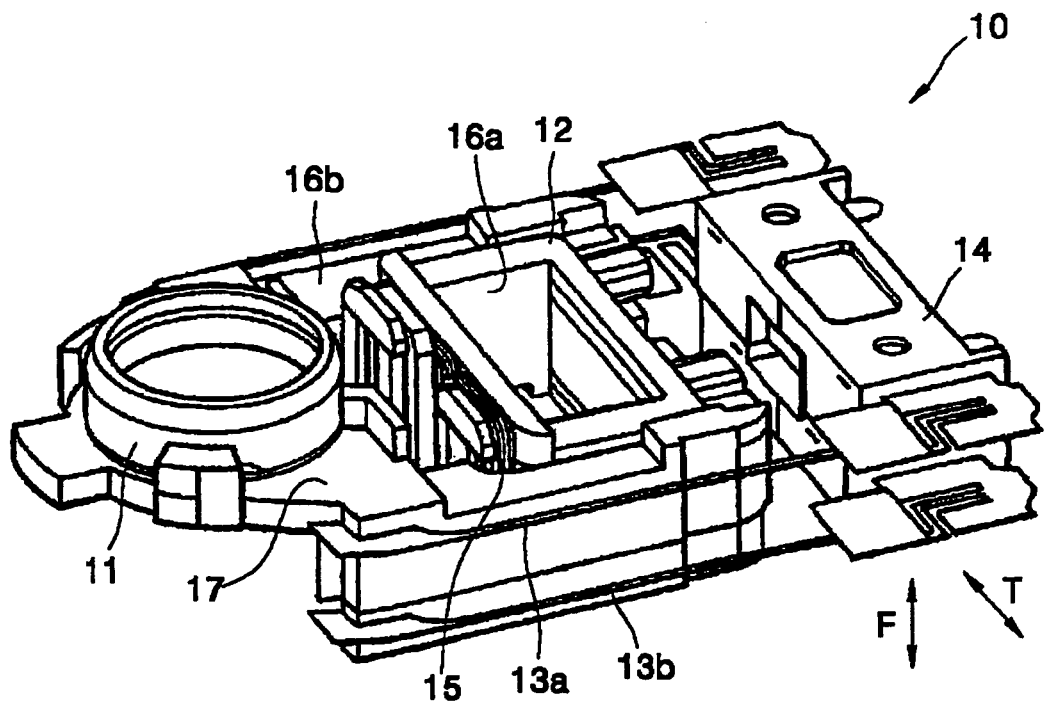
FIG. 1 is a perspective view of a conventional optical pickup actuator.
Figure 2:
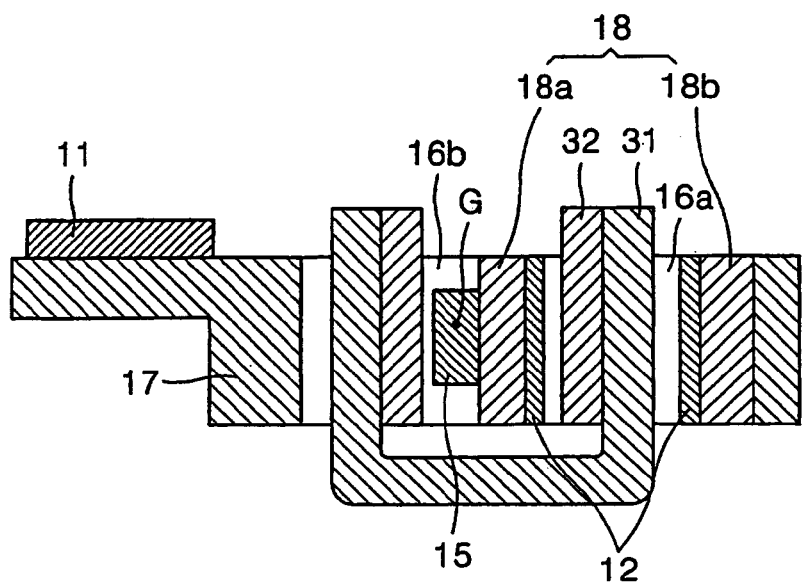
FIG. 2 is a cross-sectional view schematically showing the conventional optical pickup actuator of FIG. 1.
Figure 3A:
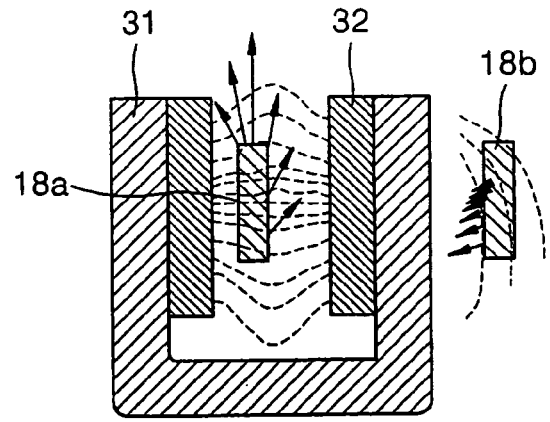
FIGS. 3A and 3B schematically show distribution of a magnetic flux in the conventional optical pickup actuator and a rotational moment thereof.
Figure 3B:
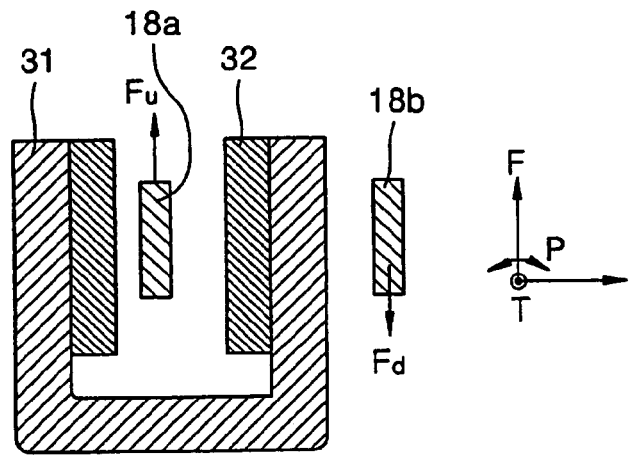
Figure 4A:
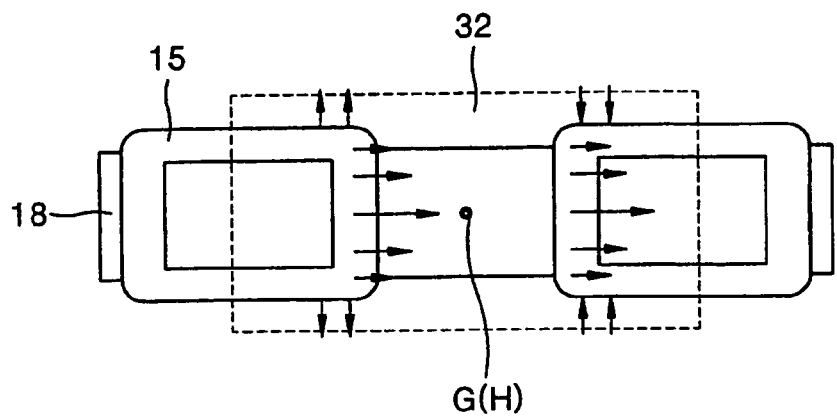
FIGS. 4A through 4D show a rolling mode generated by tracking coils in the conventional optical pickup actuator.
Figure 4B:
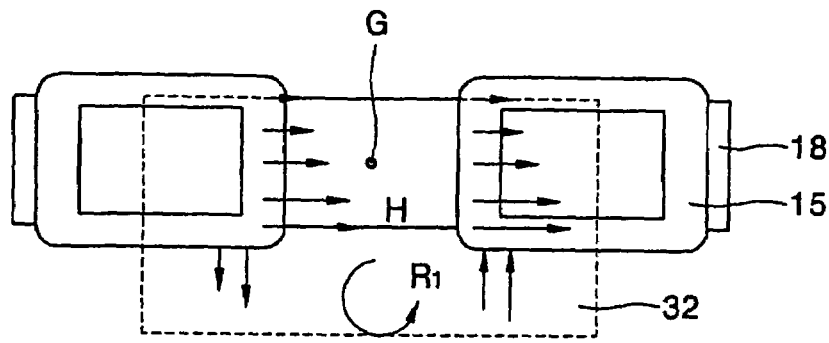
Figure 4C:
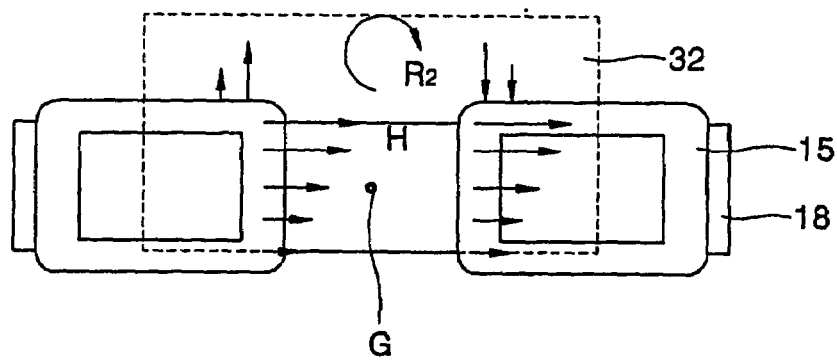
Figure 4D:
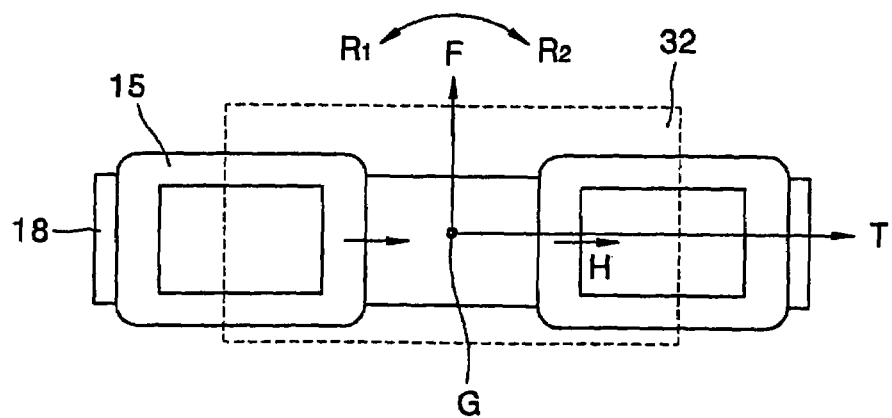

Reference will now be made in detail to embodiments of the present invention, examples of which are illustrated in the accompanying drawings, wherein like reference numerals refer to the like elements throughout. The embodiments are described below to explain the present invention by referring to the figures.

Figure 5A:
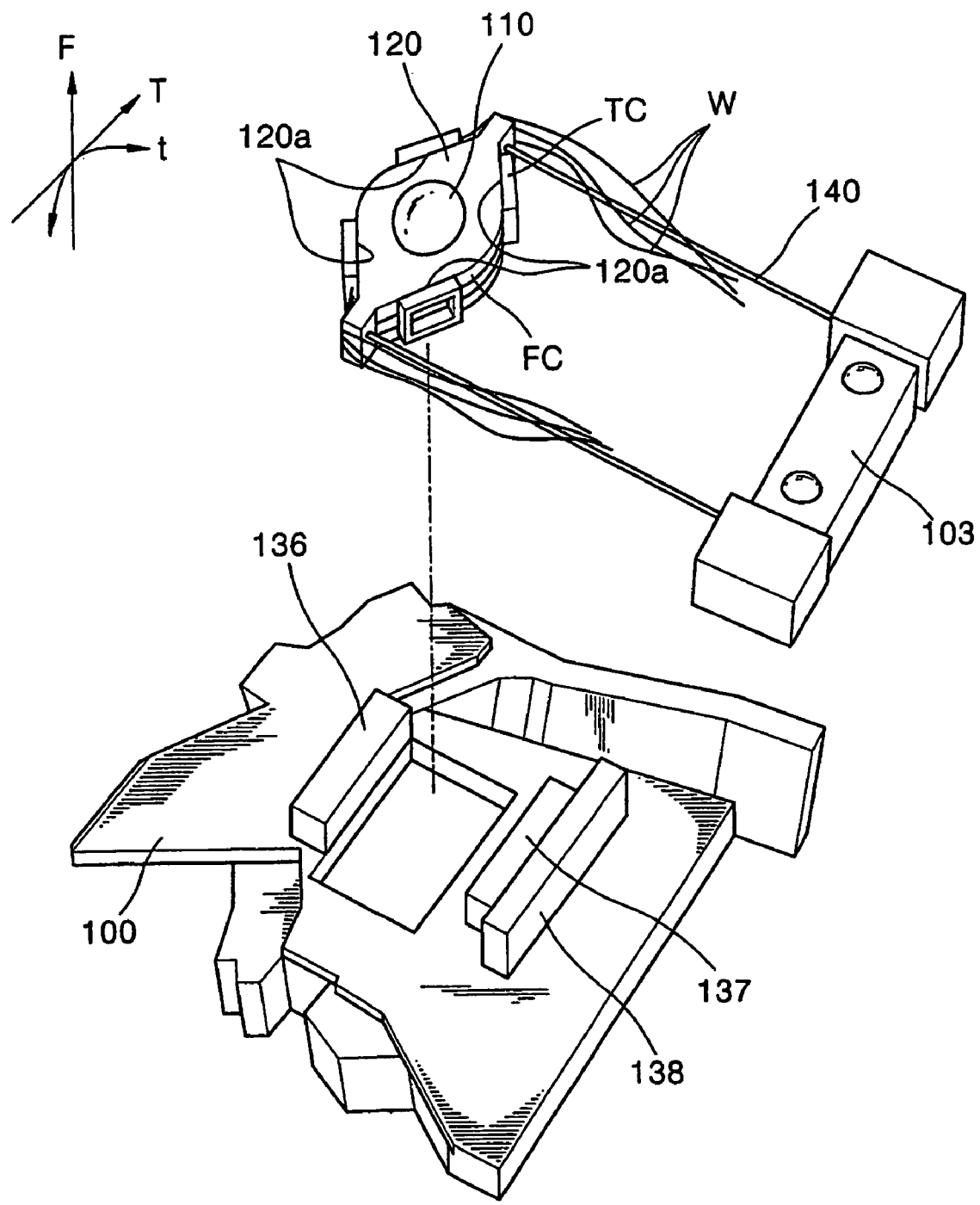
FIG. 5A is an exploded perspective view of an optical pickup actuator according to an embodiment of the present invention.
Figure 5B:
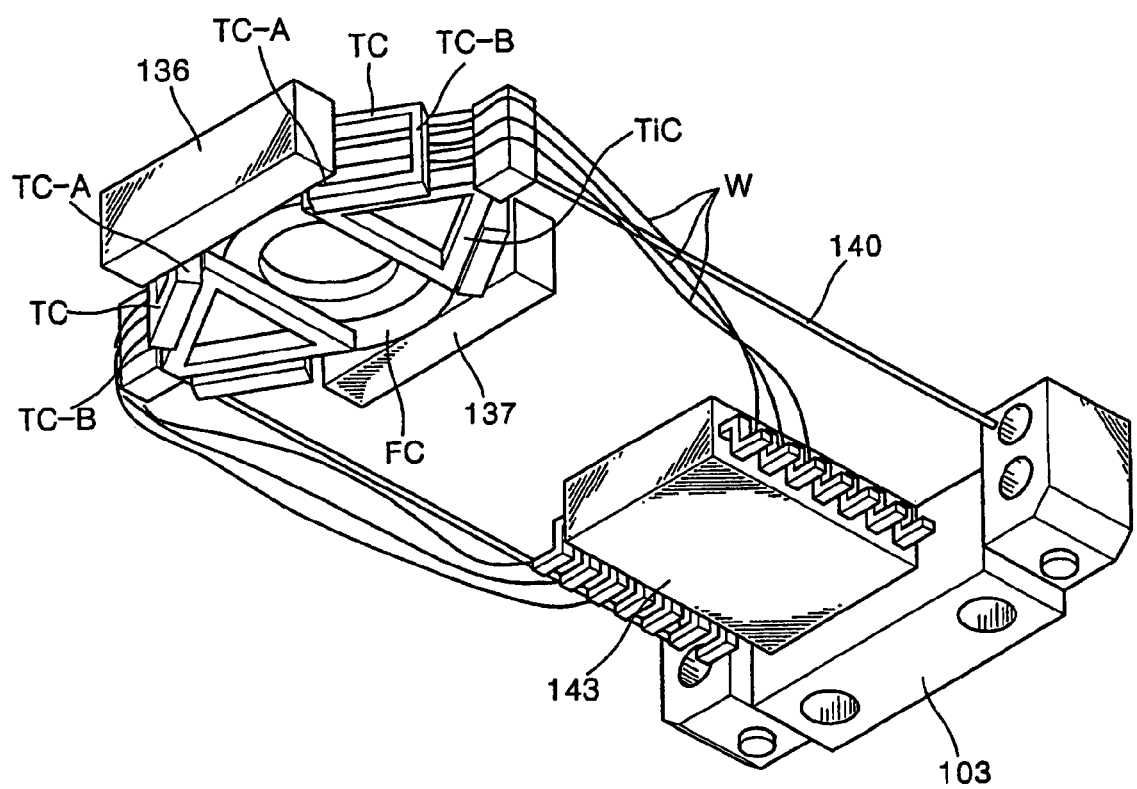
FIG. 5B is a bottom side view of the optical pickup actuator of FIG. 5A.

Referring to FIGS. 5A and 5B, an optical pickup actuator according to an embodiment of the present invention includes a lens holder 120 on which an objective lens 110 is mounted, a magnetic driving portion that drives the lens holder 120 in focusing, tracking, and tilting directions, and a support member 140, which supports the lens holder 120.

According to one aspect, in the optical pickup actuator, an optical axis of the objective lens 110 is the same as a driving axis of the lens holder 120.

The magnetic driving portion includes a focusing coil FC, a tracking coil TC, and a tilting coil TiC, which are arranged symmetrically with respect to the objective lens 110 and first and second magnets 136 and 137. The lens holder 120 is arranged between the first and second magnets 136 and 137.

The focusing coil FC is wound around the lens holder 120, and the tracking coil TC is arranged between the first and second magnets 136 and 137 and the lens holder 120.

According to one embodiment, the tracking coil TC is a coil wound in a rectangular shape. A pair of tracking coils TC are placed between the first magnet 136 and the lens holder 120, and a pair of tracking coils TC are positioned between the second magnet 137 and the lens holder 120. Only a coil at one side of each of the tracking coils TC having the rectangular shape acts as an effective coil portion TC-A. The effective coil portion TC-A represents a coil that contributes to generate an electromagnetic force by an interaction with a magnet. A coil portion TC-B opposite to the effective coil portion TC-A is an ineffective coil portion and does not contribute to generate a magnetic force. The ineffective coil portion TC-B does not face the first and second magnets 136 and 137, and thus, an interaction with the first and second magnets 136 and 137 does not occur.

According to one embodiment, in the tracking coil TC, a distance between one of the magnets and the ineffective coil portion TC-B is larger than a distance between the magnet and the effective coil portion TC-A. To position the tracking coil TC in this way, according to one embodiment, each tracking coil TC is positioned obliquely with respect to an opposite magnet. As such, an effect caused by the ineffective coil portion TC-B can be minimized.

Figure 5C:
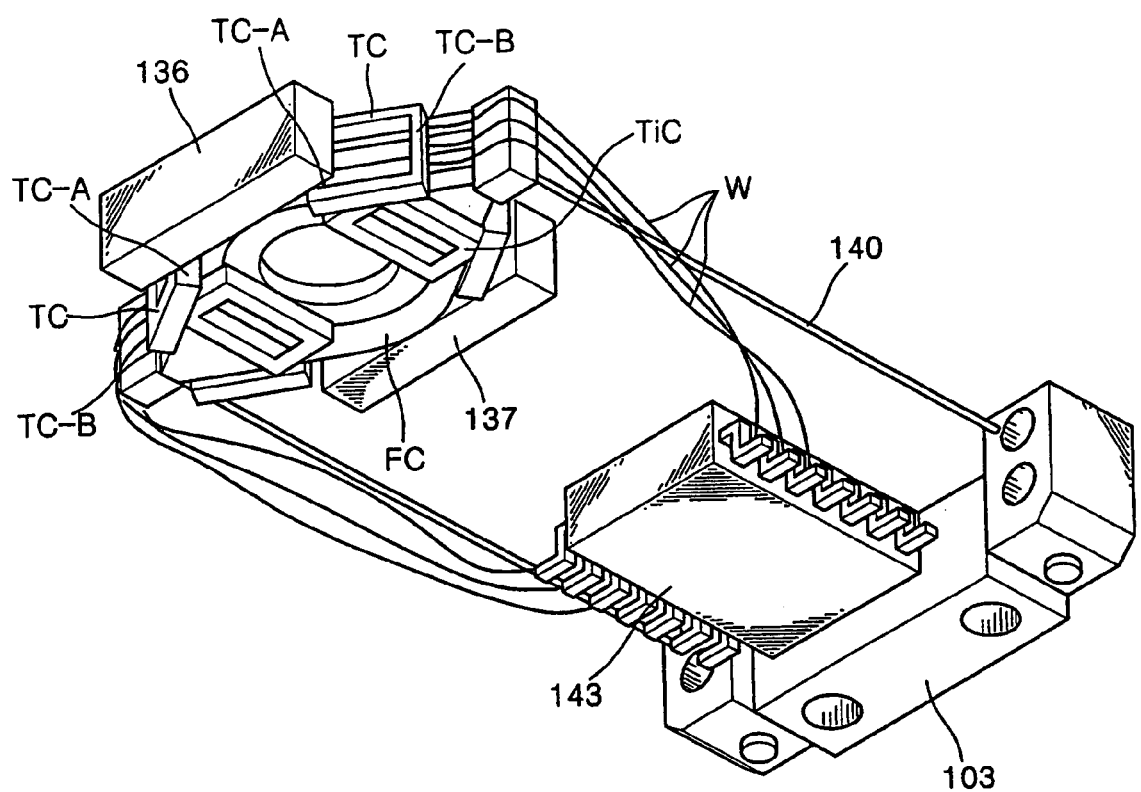
FIG. 5C shows a modified example of the optical pickup actuator of FIG. 5A.

The tilting coil TiC is positioned at opposite sides of the lens holder 120, symmetrically disposed with respect to a tracking direction. In accordance with one embodiment, FIG. 5B shows an example in which the tilting coil TiC is wound in a triangular shape. According to another embodiment, however as is shown in FIG. 5C, the tilting coil TiC is wound in a rectangular shape. With the tilting coil TiC, a coil portion opposite to the first and second magnets 136 and 137 is an effective coil portion.

The lens holder 120 is driven in the focusing direction F, the tracking direction T, and the tilting direction t by respective interactions between the focusing coil FC, the tracking coil TC, and the tilting coil TiC, and the first and second magnets 136 and 137. A current is applied to each of the focusing coil FC, the tilting coil TiC, and the tracking coil TC.

One end of the support member 140, supporting the lens holder 120 to be movable, is attached to the lens holder 120, and an other end of the support member 140 is attached to a holder 103 positioned at one side of a base 100. The support member 140 is used only to support the lens holder 120 and is not used to apply a current to the lens holder 120. Thus, the support member 140 does not need to be soldered, and according to one embodiment, is conveniently attached to the lens holder 120 and the holder 103 using an adhesive.

Wires W used to apply a current to the focusing coil FC, the tracking coil TC, and the tilting coil TiC are directly drawn out from the coils, and are connected to a drive IC (integrated circuit) by a wiring. The wires W are used to apply a current to the focusing coil FC, the tracking coil TC, and the tilting coil TiC and do not need to be used to support the lens holder 120. Thus, it becomes easy to install the wires W. In other words, the wires W need not to be soldered in the lens holder 120. Thus, there is no limitation in an installation space, and heat is not generated by overcurrent. In addition, since only the support member 140 is fixed in the lens holder 120, the actuator is slim. Even if the actuator is ultra-slim, there is no spatial problem in installing the support member 140 in the lens holder 120.

According to one embodiment, two of the wires W are used as a support member. In other words, two wires W are used to apply a current to the coils and to support the lens holder 120. When the wires W are used as the support member, soldering should be performed in the lens holder 120, and a PCB (Printed Circuit Board) should be installed.

Figure 6:
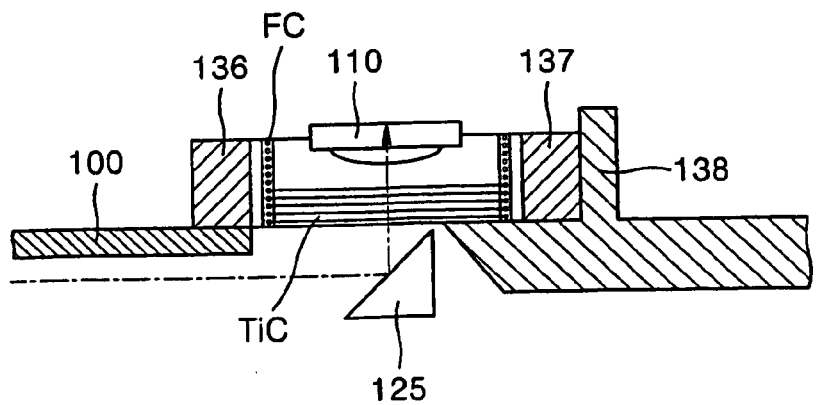
FIG. 6 is a cross-sectional view of the optical pickup actuator of FIG. 5A.

The first magnet 136 is positioned on the base 100 so that advancing of light incident on the objective lens 110 is not disturbed. In addition, the second magnet 137 is arranged in a yoke 138. In particular, FIG. 6 shows a relation in which the actuator according to the present invention is combined with a peripheral optical system. Light emitted from a light source (not shown) is reflected on a reflector 125 and is incident on the objective lens 110. The first magnet 136 is not positioned on an advancing path of light incident on the reflector 125, but rather, the first magnet is positioned on the base 100 to prevent blockage of an optical path.

Embodiments of the present invention provide a symmetric actuator with which it is unnecessary to change a structure of a conventional optical system in a vicinity of the actuator, to accommodate the symmetric actuator of the present invention. An asymmetric actuator represents an actuator having an optical axis of an optical system different from a driving axis of an actuator, and a symmetric actuator represents an actuator having the same optical axis of the optical system as the driving axis of the actuator.

A structure of the optical pickup actuator according to an embodiment of the present invention is similar to a structure of an existing asymmetric actuator in that the lens holder 120 is placed in a front portion of the actuator. Since the magnetic driving portion is arranged symmetrically around the lens holder 120, the optical pickup actuator has a structure of a symmetric actuator.

Figure 7:
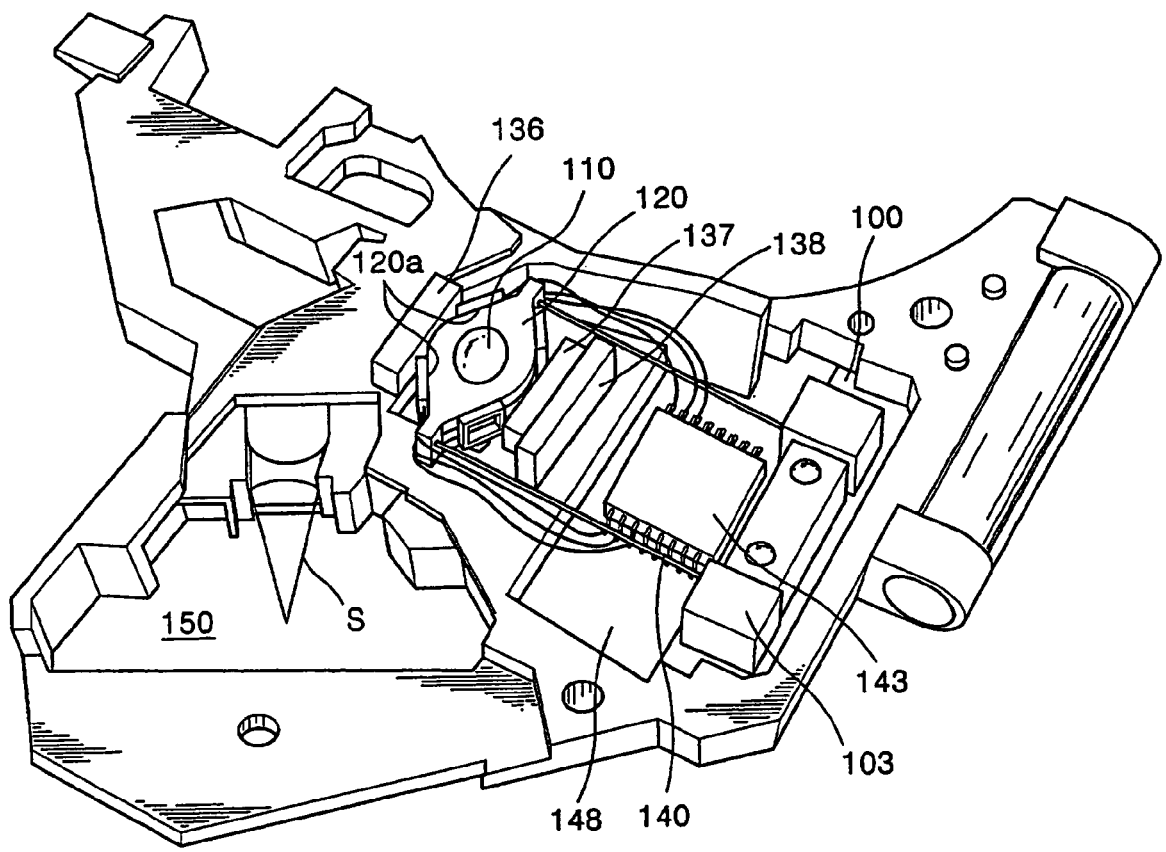
FIG. 7 shows an arrangement relation between the optical pickup actuator of FIG. 5A and an optical system.

Further, according to one embodiment, the lens holder 120 has an inclined portion 120a (see FIG. 7) in consideration of a combination structure of a peripheral optical system. For example, the lens holder 120 includes the inclined portion 120a at four sides of the lens holder 120. The inclined portion 120a is formed in this way such that the lens holder 120 may be formed in a nearly diamond shape. When the tracking coil TC is arranged in the inclined portion 120a in a direction of an oblique line, as is shown in FIG. 7, the lens holder 120 can be properly combined with an optical system 150 so that light advances obliquely with respect to the actuator. The optical system used in the optical recording and/or reproducing apparatus has both a structure in which light is incident perpendicular to the actuator and a structure in which light is incident obliquely to the actuator. FIG. 7 shows a structure in which an optical system is arranged inclined to the actuator, and a profile of light is indicated by S.

But as is shown in FIG. 7, the optical system having a structure in which light is incident obliquely with respect to the actuator, is properly combined with an actuator in which a front portion of the lens holder 120 has a nearly triangular shape.

Thus, the lens holder 120 has a nearly diamond shape, so that the front portion of the lens holder 120 has a nearly triangular shape. Thus, the optical pickup actuator according to the present invention has a symmetric structure, and can be combined with the optical system without changing the structure of the existing optical system.

In addition, the magnetic driving portion is arranged inclined to the front portion of the optical pickup actuator such that a spare space 148 is formed between the magnetic driving portion and the holder 103 and a drive IC 143 or other components may be installed in the spare space 148.

Figure 8:
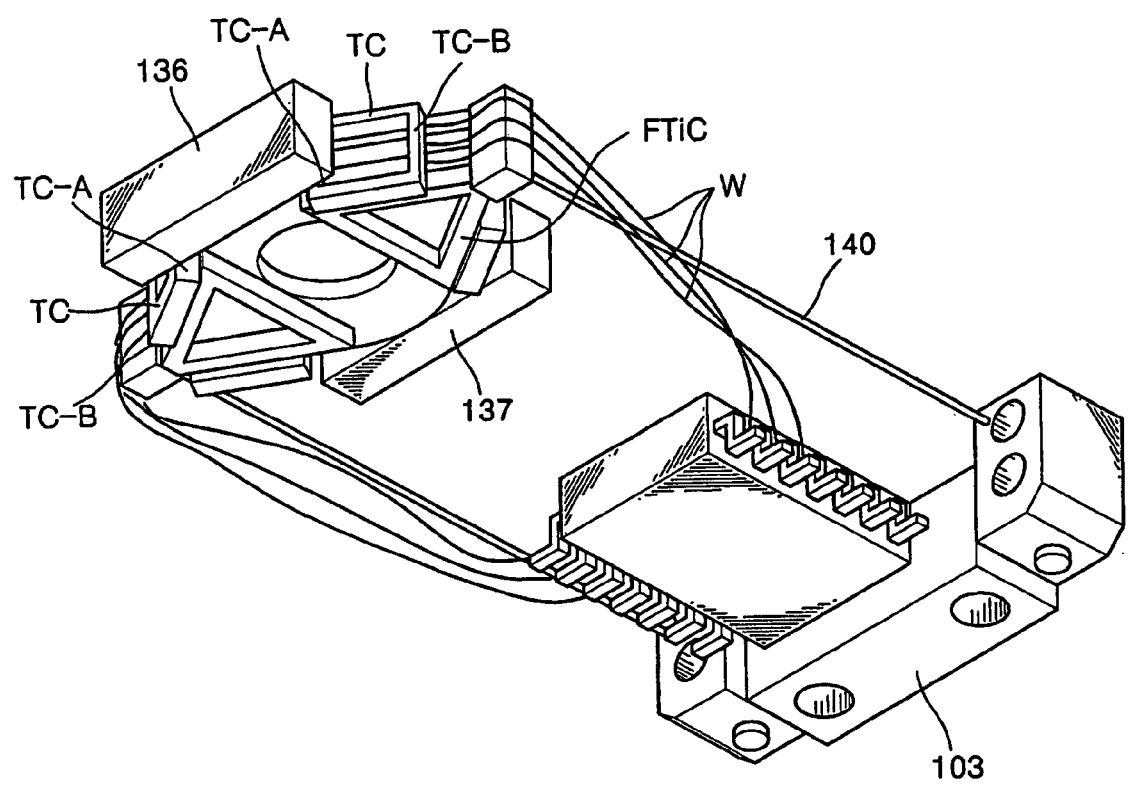
FIG. 8 shows another modified example of the optical pickup actuator of FIG. 5A.

Next, another modified example of the optical pickup actuator according to an embodiment of the present invention is shown in FIG. 8. Elements of FIG. 8 using the same reference numerals as those of FIGS. 5A and 5B have the same functions and thus, detailed descriptions thereof will be omitted.

In the optical pickup actuator described in FIGS. 5A, 5B, and 5C, a current is independently applied to the focusing coil FC and the tilting coil TiC. When the current is independently applied to each coil, a current for focusing driving and a current for tilting driving are applied to the focusing coil FC and the tilting coil TiC, respectively. The focusing coil FC and the tilting coil TiC may be used together. When a tilting and focusing coil is used in this way, as is shown in FIG. 8, the tracking coil TC is arranged inclined to four sides of the lens holder 120, and a tilting and focusing coil FTiC is arranged in a lower portion of the lens holder 120 on right and left sides one by one centering on a symmetric axis of the lens holder 120. According to one embodiment, the tilting and focusing coil FTiC is wound in a triangular shape. At another embodiment, the tilting and focusing coil TfiC is wound in a rectangular shape. A coil portion opposite to the first and second magnets 136 and 137 becomes an effective coil.

When focusing driving and tilting driving are performed using a common coil, a current, in which a current for focusing driving is added to a current for tilting driving, is applied to the tilting and focusing coil FTiC. A first signal, in which a tilting signal having a first phase is added to a focusing signal, and a second signal, in which a tilting signal having a phase different from the first phase is added to the focusing signal, are input into the tilting and focusing coil FTiC. According to one embodiment, a difference in phases of the first and second signals is 180 degrees.

Figure 9:
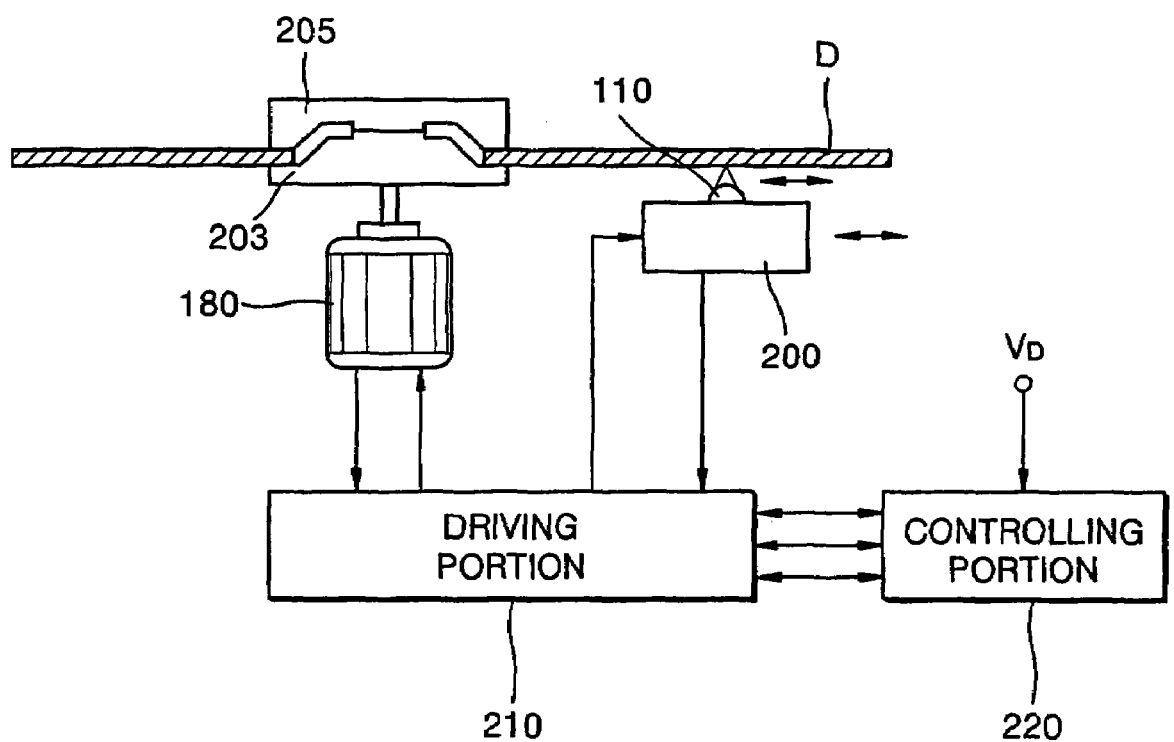
FIG. 9 schematically shows an optical recording/reproducing apparatus using the optical pickup actuator of FIG. 5A.

Referring to FIG. 9, in an optical recording and/or reproducing apparatus using the optical pickup actuator according to an embodiment of the present invention, a spindle motor 180 rotating a disc D is installed under a turntable 203, the disc D is mounted on the turntable 203, and a clamp 205 chucking the disc D by an electromagnetic force generated by an interaction with the turntable 203 is opposite to the turntable 203. When the disc D is rotated by the spindle motor 180, an optical pickup 200 is installed to be movable in a radial direction of the disc D, and records and/or reproduces information on and/or from the disc D.

The spindle motor 180 and the optical pickup 200 are driven by a driving portion 210, and focusing, tracking, and tilting servos of the optical pickup 200 are controlled by a controlling portion 220 such that recording and/or reproducing of data is performed on/from the disc D. The optical pickup 200 includes an optical system having the objective lens 110 and an optical pickup actuator driving the objective lens 110 in focusing, tracking, and tilting directions.

A signal that is detected by the optical pickup 200 and is photoelectrically transformed, is input into the controlling portion 220 through the driving portion 210. The driving portion 210 controls a rotational speed of the spindle motor 180, amplifies the input signal, and drives the optical pickup 200. The controlling portion 220 transmits focusing servo, tracking servo, and tilt servo commands that are adjusted based on the signal input from the driving portion 210, to the driving portion 210, so that focusing servo, tracking servo, and tilt servo operations of the optical pickup 200 are performed.

As is described above, in the optical pickup actuator according to an embodiment of the present invention, a support member supporting a lens holder is provided separately from wires used to apply a current to coils such that a soldering work needs not to be performed. Even though the number of wires is increased, the wires can be installed without requiring a large installation space. As such, the actuator can be made slim, and defects occurring when a plurality of wires are soldered can be prevented.

In addition, the optical pickup actuator is configured symmetrically, such that subsidiary resonance caused by an asymmetric structure is prevented, and stability of a system and high-precision control can be achieved. The magnetic driving portion is arranged inclined to the front portion of the optical pickup actuator, and the lens holder is formed in a nearly diamond shape, such that a structure of an existing optical system can be used without changes.

The optical pickup and the optical recording and/or reproducing apparatus uses the optical pickup actuator without structure change, such that the optical pickup actuator having a high performance can be used without increasing manufacturing costs caused by structure change. In particular, in a drive for a notebook computer, the actuator needs to be slim, and the number of wires should be at least six to perform focusing control, tracking control, and tilting control. The support member supporting the lens holder is separately provided, such that the actuator can be slim and the wires can be easily installed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup actuator comprising:
   a holder positioned at one side of a base;
   a lens holder on which an objective lens is mounted;
   a magnetic driving portion having focusing coils, tracking coils, and tilting coils, and a magnet used to drive the lens holder in focusing, tracking, and tilting directions;
   at least one support member supporting the lens holder, one end of the support member being combined with the holder, and an other end thereof being combined with the lens holder; and
   wires installed separate from the support member, one end of each of the wires being combined with the holder and the other end thereof being directly combined with a corresponding one of the focusing coils, a corresponding one of the tracking coils, and a corresponding one of the tilting coils to apply a current to the focusing coil, the tracking coil, and the tilting coil.

2. The optical pickup actuator of claim 1, wherein the lens holder is approximately diamond shaped.

3. The optical pickup actuator of claim 1, wherein the wires are provided separate from the support member such that soldering is not required.

4. The optical pickup actuator of claim 1, wherein:
   the focusing coil is positioned around the lens holder;
   the tracking coil is positioned obliquely with respect to the magnet; and
   the tilting coil is positioned symmetrically with respect to a tracking direction at a first surface of the lens holder.

5. The optical pickup actuator of claim 1, wherein:
   the focusing coil is positioned around the lens holder;
   the tracking coil is positioned inclined to the magnet; and
   the tilting coil is symmetrically positioned at a first surface of the lens holder, with respect to a tracking direction.

6. The optical pickup actuator of claim 5, wherein the titling coil is wound in a triangular shape.

7. The optical pickup actuator of claim 5, wherein the titling coil is wound in a rectangular shape.

8. The optical pickup actuator of claim 1, wherein the wires are drawn out from the focusing coil, the tracking coil, and the tilting coil, and are combined with a drive IC.

9. The optical pickup actuator of claim 1, wherein the magnet is installed in a base placed in a first direction of a path in which light emitted from an optical system transmitting light to the objective lens advances.

10. The optical pickup actuator of claim 1, wherein:
    an optical system transmitting light to the objective lens is positioned inclined with respect to the lens holder; and
    the lens holder comprises an inclined portion to prevent blockage of an optical path of light emitted from the optical system.

11. The optical pickup actuator of claim 1, wherein:
    the focusing coil and the tilting coil are combined; and
    the tilting and focusing coil is positioned symmetrically with respect to a tracking direction at a first surface of the lens holder.

12. The optical pickup actuator of claim 11, wherein a first signal, in which a tilting signal having a first phase is added to a focusing signal, and a second signal, in which a tilting signal having a phase different from the first phase is added to the focusing signal, are input into the tilting and focusing coil.

13. The optical pickup actuator of claim 1, wherein:
    the focusing coil, the tracking coil, and the tilting coil are positioned symmetrically with respect to the objective lens; and
    the magnet is positioned at opposing sides of the lens holder.

14. The optical pickup actuator of claim 1, wherein: an optical axis of the objective lens is collinear with a driving axis of the lens holder.

15. An optical pickup, which is installed to be movable in a radial direction of a disc, the optical pickup comprising:
    an optical system having an objective lens to record and/or reproduce information on and/or from the disc; and
    an optical pickup actuator which controls focusing, tracking, and tilting servos of the objective lens, the optical pickup actuator comprising
    a holder positioned at one side of a base,
    a lens holder on which the objective lens is mounted,
    a magnetic driving portion having focusing coils, tracking coils, and tilting coils, and a magnet used to drive the lens holder in focusing, tracking, and tilting directions,
    at least one support member supporting the lens holder, one end of the support member being combined with the holder, and an other end thereof being combined with the lens holder, and
    wires installed separate from the support member, one end of each of the wires being combined with the holder and the other end thereof being directly combined with a corresponding one of the focusing coils, a corresponding one of the tracking coils, and a corresponding one of the tilting coils to apply a current to the focusing coil, the tracking coil, and the tilting coil.

16. The optical pickup of claim 15, wherein the wires are provided separate from the support member such that soldering is not required.

17. The optical pickup of claim 15, wherein the lens holder is combined with the optical system such that light advances obliquely with respect to the optical pickup actuator.

18. The optical pickup of claim 15, wherein:
    the magnetic driving portion is positioned inclined with respect to a first portion of the optical pickup actuator;
    the optical system is an existing optical system; and
    the lens holder is approximately diamond shaped, to combine the lens holder with the existing optical system without modification of the existing optical system.

19. The optical pickup of claim 15, wherein the lens holder is approximately diamond shaped.

20. The optical pickup of claim 15 wherein the lens holder is approximately diamond shaped, such that a first portion of the lens holder is approximately triangular shaped.

21. The optical pickup of claim 20 wherein the lens holder is combined with the optical system such that light advances obliquely with respect to the optical pickup actuator.

22. The optical pickup of claim 15, wherein:
    the focusing coil, the tracking coil, and the tilting coil are positioned symmetrically with respect to the objective lens; and
    the magnet is positioned at opposing sides of the lens holder.

23. The optical pickup of claim 22, wherein:
    the focusing coil is positioned around the lens holder;
    the tracking coil is positioned inclined with respect to the magnet; and the tilting coil is positioned symmetrically with respect to a tracking direction at a first surface of the lens holder.

24. The optical pickup of claim 22, wherein:
the focusing coil is positioned around the lens holder;
the tracking coil is positioned obliquely with respect to the magnet; and
the tilting coil is positioned symmetrically with respect to a tracking direction at a first surface of the lens holder.

25. The optical pickup of claim 15, wherein the wires are drawn out from the focusing coil, the tracking coil, and the tilting coil, and are combined with a drive IC.

26. The optical pickup of claim 15, wherein:
the optical system is positioned inclined with respect to the lens holder; and
the lens holder comprises an inclined portion to prevent blockage of an optical path of light emitted from the optical system.

27. An optical recording and/or reproducing apparatus to record and/or reproduce information on and/or from an optical disc, the optical recording and/or reproducing apparatus comprising:
an objective lens;
an optical system;
a lens holder on which the objective lens is mounted; and
an optical pickup actuator to move the lens holder, the optical pickup actuator comprising
a holder positioned at one side of a base,
a magnetic driving portion having focusing coils, tracking coils, and tilting coils, and a magnet used to drive the lens holder in focusing, tracking, and tilting directions,
at least one support member supporting the lens holder, one end of the support member being combined with the holder, and an other end thereof being combined with the lens holder, and
wires installed separate from the support member, one end of each of the wires being combined with the holder and the other end thereof being directly combined with a corresponding one of the focusing coils, a corresponding one of the tracking coils, and a corresponding one of the tilting coils to apply a current to the focusing coil, the tracking coil, and the tilting coil.

28. The apparatus of claim 27, wherein the wires are provided separate from the support member such that soldering is not required.

29. The apparatus of claim 27, wherein the lens holder is combined with the optical system such that light advances obliquely with respect to the optical pickup actuator.

30. The apparatus of claim 27, wherein:
the magnetic driving portion is positioned inclined with respect to a first portion of the optical pickup actuator;
the optical system is an existing optical system; and
the lens holder is approximately diamond shaped, to combine the lens holder with the existing optical system without modification of the existing optical system.

31. The apparatus of claim 27, wherein the lens holder is approximately diamond shaped.

32. The apparatus of claim 27 wherein the lens holder is approximately diamond shaped, such that a first portion of the lens holder is approximately triangular shaped.

33. The apparatus of claim 32 wherein the lens holder is combined with the optical system such that light advances obliquely with respect to the optical pickup actuator.

34. The apparatus of claim 31, wherein:
the focusing coil, the tracking coil, and the tilting coil are positioned symmetrically with respect to the objective lens; and
the magnet is positioned at opposing sides of the lens holder.

35. The apparatus of claim 27, wherein:
the focusing coil is positioned around the lens holder;
the tracking coil is positioned inclined with respect to the magnet, and
the tilting coil is positioned symmetrically with respect to a tracking direction at a first surface of the lens holder.

36. The apparatus of claim 27, wherein:
the focusing coil is positioned around the lens holder;
the tracking coil is positioned obliquely with respect to the magnet; and
the tilting coil is positioned symmetrically with respect to a tracking direction at a first surface of the lens holder.

37. The apparatus of claim 27, wherein the wires are drawn out from the focusing coil, the tracking coil, and the tilting coil, and are combined with a drive IC.

38. The apparatus of claim 27, wherein:
an optical system transmitting light to the objective lens is positioned inclined with respect to the lens holder;
the lens holder comprises an inclined portion to prevent blockage of an optical path of light emitted from the optical system.

* * * * *